UNITED STATES PATENT OFFICE.

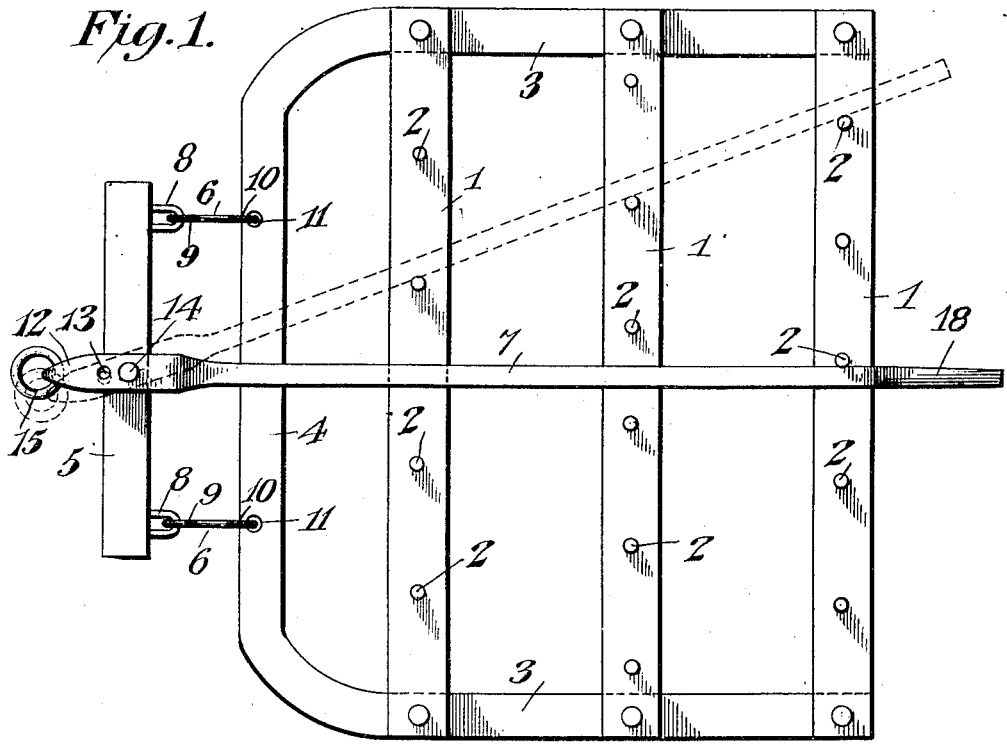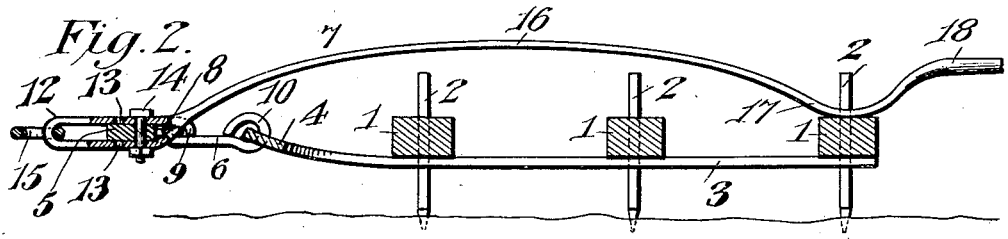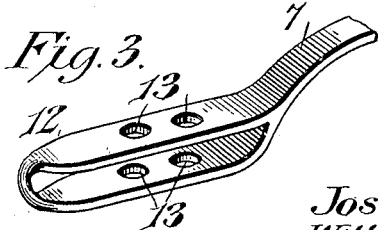

JOSEPH MILLER GLICK AND WILLIAM JOEL GLICK, OF NEAR BRIDGEWATER, VIRGINIA.

HARROW.

No. 904,864.  Specification of Letters Patent.  Patented Nov. 24, 1908.

Application filed July 30, 1908. Serial No. 446,180.

*To all whom it may concern:*

Be it known that we, JOSEPH MILLER GLICK and WILLIAM JOEL GLICK, citizens of the United States, residing near Bridgewater, in the county of Augusta and State of Virginia, have invented a new and useful Harrow, of which the following is a specification.

The invention relates to improvements in harrows.

The object of the present invention is to improve the construction of harrows, and to provide a simple, inexpensive and efficient device, capable of being easily operated without stopping the team, and adapted to reduce the side draft to a minimum when cultivating on hillsides, and capable of preventing a harrow equipped with staggered teeth from shifting downward and causing two or more teeth to follow the same line, and thereby impair the efficiency of the harrow.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a plan view of a harrow provided with draft controlling means, constructed in accordance with this invention. Fig. 2 is a longitudinal sectional view of the same. Fig. 3 is an enlarged detail perspective view of the front end of the clevis lever.

Like numerals of reference designate corresponding parts in all the figures of the drawing.

The harrow is provided with a plurality of transversely disposed tooth bars 1, equipped with vertical harrow teeth 2, piercing the transverse bars 1 and projecting above the same in the usual manner, as clearly illustrated in Fig. 2 of the drawing.
The harrow bars are connected by a substantially U-shaped metallic frame, composed of sides 3 and a connecting transverse portion 4, but as the improvements herein shown and described are applicable to various constructions of harrows, the harrow frame and tooth bars may be constructed in any desired manner. The harrow is equipped at its front with a transverse draft bar 5, connected by links 6 with the front of the harrow and having the front portion of a clevis lever 7 fulcrumed on it. The transverse draft bar is provided near its ends with rearwardly extending eyes, formed by staples 8, or other suitable means and receiving eyes 9 of the links 6. The links are also provided at their rear ends with eyes 10, which are linked into perforations 11 of the frame of the harrow.

The clevis lever is provided at its front end with an oblong longitudinal loop 12, receiving the transverse draft bar 5 and provided in its upper and lower portions with a plurality of perforations 13 for the reception of a vertical pivot bolt 14, which also pierces the draft bar 5 at the center thereof. The front end of the draft lever is provided with a ring 15, linked in the loop and adapted to receive a hook, or any other suitable means for connecting a doubletree or swingletree with the harrow. The clevis lever is arched at an intermediate point at 16 to clear the front and intermediate tooth bars of the harrow, and it is provided near its rear end with a depending bend 17, arranged to rest upon the rear tooth bar of the harrow and adapted to engage one of the teeth thereof, whereby it is held in its adjustment. The clevis lever, which has its rear end 18 shaped into a handle, projects rearwardly from the harrow, and is adapted to be readily grasped by the operator to shift the lever for changing the position of the clevis with relation to the center of the harrow.

The harrow teeth are arranged in staggered relation, the harrow teeth of one tooth bar being located opposite the intervals between the harrow teeth of the other tooth bars. In order to prevent the harrow, when cultivating hillsides, from sliding downward and changing the arrangement of the teeth with relation to the line of draft, the rear end of the clevis lever is adjusted towards the lower side of the harrow, the adjustment being in proportion to the slope of the hill, and the rear end of the clevis lever is dropped between the rear harrow teeth, which maintains the lever in its adjustment. The draft upon the lever will maintain the same in engagement with the tooth, and the lever will have a tendency to hold the rear end of the harrow up hill. The shifting of the front arm or portion of the lever laterally in the direction of the hill will have a tendency to cause the team to draw the front end of the harrow down the hill, and the clevis lever will operate to cause the harrow to run square with the teeth in their staggered relation.

As the clevis lever does not require any fastening means for securing it in its adjustment, and as it may be substituted for the ordinary clevis attachment, it is adapted to be applied to the ordinary harrow without necessitating any alteration in the construction thereof.

Having thus fully described our invention, what we claim as new and desire to secure by Letters Patent, is:—

The combination with a harrow provided with upwardly projecting teeth, of a transversely disposed draft bar arranged in advance of the harrow and loosely connected at its end portions with the front of the harrow, and a clevis lever provided at its front portion with an oblong loop receiving the transverse draft bar and pivoted to the same and projecting in advance of the draft bar for connection to a whiffletree, said clevis lever being arched to clear the front and intermediate harrow teeth and provided at its rear portion with a depending bend arranged to rest upon the rear portion of the harrow and engage the rear teeth thereof.

In testimony, that we claim the foregoing as our own, we have hereto affixed our signatures in the presence of two witnesses.

JOSEPH MILLER GLICK.
WILLIAM JOEL GLICK.

Witnesses:
　JAS. R. SHIPMAN,
　S. H. W. BYRD.